United States Patent
Klassen et al.

(10) Patent No.: US 7,000,309 B1
(45) Date of Patent: Feb. 21, 2006

(54) METHOD OF ASSEMBLING A DISK DRIVE BY ELECTRICALLY GROUNDING A DISK DRIVE COVER

(75) Inventors: Andrew S. Klassen, San Jose, CA (US); May C. Kung, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 463 days.

(21) Appl. No.: 10/184,610

(22) Filed: Jun. 28, 2002

(51) Int. Cl.
*H04R 31/00* (2006.01)

(52) U.S. Cl. ............... 29/603.03; 29/592.1; 29/603.01; 361/684; 361/685; 360/97.01; 360/99.08; 360/106

(58) Field of Classification Search ............... 29/603.01–603.07, 592.1; 361/684, 685; 360/97.01–98.02, 98.07, 98.08, 99.08, 99.11, 360/99.12, 104–106, 137, 900–904
See application file for complete search history.

(56) References Cited

U.S. PATENT DOCUMENTS

| | | | |
|---|---|---|---|
| 4,363,056 A | | 12/1982 | Riggle et al. |
| 4,966,556 A | * | 10/1990 | Reymond et al. ............. 439/80 |
| 5,241,438 A | * | 8/1993 | Matsushima ............. 360/254.8 |
| 5,245,486 A | * | 9/1993 | Hachiya et al. .......... 360/97.01 |
| 5,282,099 A | * | 1/1994 | Kawagoe et al. ........ 360/97.01 |
| 5,313,015 A | * | 5/1994 | Hoge ....................... 174/35 R |
| 5,454,157 A | | 10/1995 | Ananth et al. |
| 5,726,829 A | * | 3/1998 | Bodmer et al. .......... 360/99.08 |
| 5,880,904 A | * | 3/1999 | Mizoshita et al. ....... 360/97.01 |
| 5,969,901 A | * | 10/1999 | Eckberg et al. .......... 360/97.01 |
| 6,512,654 B1 | | 1/2003 | Teshima |
| 6,522,536 B1 | * | 2/2003 | Brewer et al. ............. 361/687 |
| 6,661,603 B1 | | 12/2003 | Watkins et al. |

* cited by examiner

*Primary Examiner*—Rick Kiltae Chang
(74) *Attorney, Agent, or Firm*—Stetina, Brunda, Garred & Brucker; Joshua C. Harrison, Esq.

(57) ABSTRACT

A method of assembling a disk drive includes providing a disk drive base. The method further includes providing a disk drive cover having an inside face and an outside face. The inside face is coated with an electrically insulative material. The method further includes contacting, continuously during a period, the outside face with an electrically conductive grounding element that is part of an assembly fixture that is not part of the disk drive being assembled. The method further includes attaching the disk drive cover to the disk drive base during the period.

7 Claims, 6 Drawing Sheets

METHOD OF ASSEMBLING A DISK DRIVE BY ELECTRICALLY GROUNDING A DISK DRIVE COVER

CROSS-REFERENCE TO RELATED APPLICATIONS

Not applicable.

BACKGROUND OF THE INVENTION

1. Field of the Invention

The present invention relates generally to disk drives, and more particularly to a method of assembling a disk drive while electrically grounding a disk drive cover.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes a head which is distally attached to each of the actuator arms. The actuator assembly includes the actuator body that has a bore and a pivot bearing cartridge engaged within the bore. The head gimbal assembly and the flex circuit cable assembly are attached to the actuator assembly.

A plurality of fasteners, such as metal screws, are disposed about a periphery of the disk drive cover and engage the periphery of the disk drive base for attachment of the disk drive cover with the disk drive base. Typically, a fastener is engaged to the pivot bearing cartridge through the disk drive cover, and another fastener is engaged to the spindle motor also through the disk drive cover.

For any number of reasons, it may be desirable to provide a coating, such as E-coating, about the surface of the disk drive cover. For example, the coating may be utilized as a corrosion barrier for protecting the disk drive cover.

A problem that is introduced with the application of such a coating upon the disk drive cover is that the coated disk drive cover may become electrically insulated from other portions of the disk drive, because the coating tends to be electrically insulative in nature. In the absence of the coating, the disk drive cover is typically in direct electrical contact with a grounded portion of a fixture utilized to support the disk drive cover during assembly of the disk drive cover to the disk drive base thereby grounding the disk drive cover. On the coated disk drive cover, however, a static electric charge may be built up on the surface of the coated disk drive cover. Unless removed, this static electric charge creates a high voltage potential between the disk drive cover and the other portions of the disk drive that may discharge to any number of the components within the disk drive, such as the transducers. Such a discharge may damage the disk drive components.

Accordingly, there is a need in the art for an improved method of assembling the disk drive and in particular grounding the disk drive cover during the attachment process in comparison to the prior art.

SUMMARY OF THE INVENTION

An aspect of the invention can be regarded a method of assembling a disk drive. The disk drive includes a disk drive cover and a base assembly. The disk drive cover includes a main cover portion having opposing sides and formed of an electrically conductive material. The disk drive cover further includes an electrically insulative coating and a grounding opening formed through the electrically insulative coating. The main cover portion includes an exposed surface at the grounding opening. The method includes mounting the base assembly upon a base support portion of a fixture, and mounting the disk drive cover upon a cover support portion of the fixture. The method further includes positioning the disk drive cover with a grounding element of the fixture in electrical contact with the exposed surface for electrically grounding the disk drive cover. The method further includes attaching the disk drive cover to the base assembly.

According to various embodiments, the main cover portion is formed of a metallic material, such as carbon steel or aluminum for example. In another embodiment, the main cover portion may be formed of a plastic material. The grounding element may be formed as a pin, and may be spring loaded. The base assembly may include a disk drive base. The grounding opening may be formed through the main cover portion, and the exposed surface may be an inner surface within the main cover portion. In another arrangement, the exposed surface is disposed upon a respective one of the opposing sides. The grounding element may be in electrical contact with the exposed surface by direct physical contact between the grounding element and the exposed surface. In another arrangement, the grounding element may be in electrical contact with the exposed surface via an intermediate contact element. Upon attaching the disk drive cover to the base assembly, the method may provide for electrically grounding the disk drive cover to the base assembly. In this regard, conductive fasteners may be inserted through fastener openings formed in the disk drive cover into fastener engagement holes formed in the base assembly for attaching the disk drive cover to the base assembly and electrically grounding the disk drive cover to the base assembly.

DESCRIPTION OF THE PREFERRED EMBODIMENTS

Figure 1:
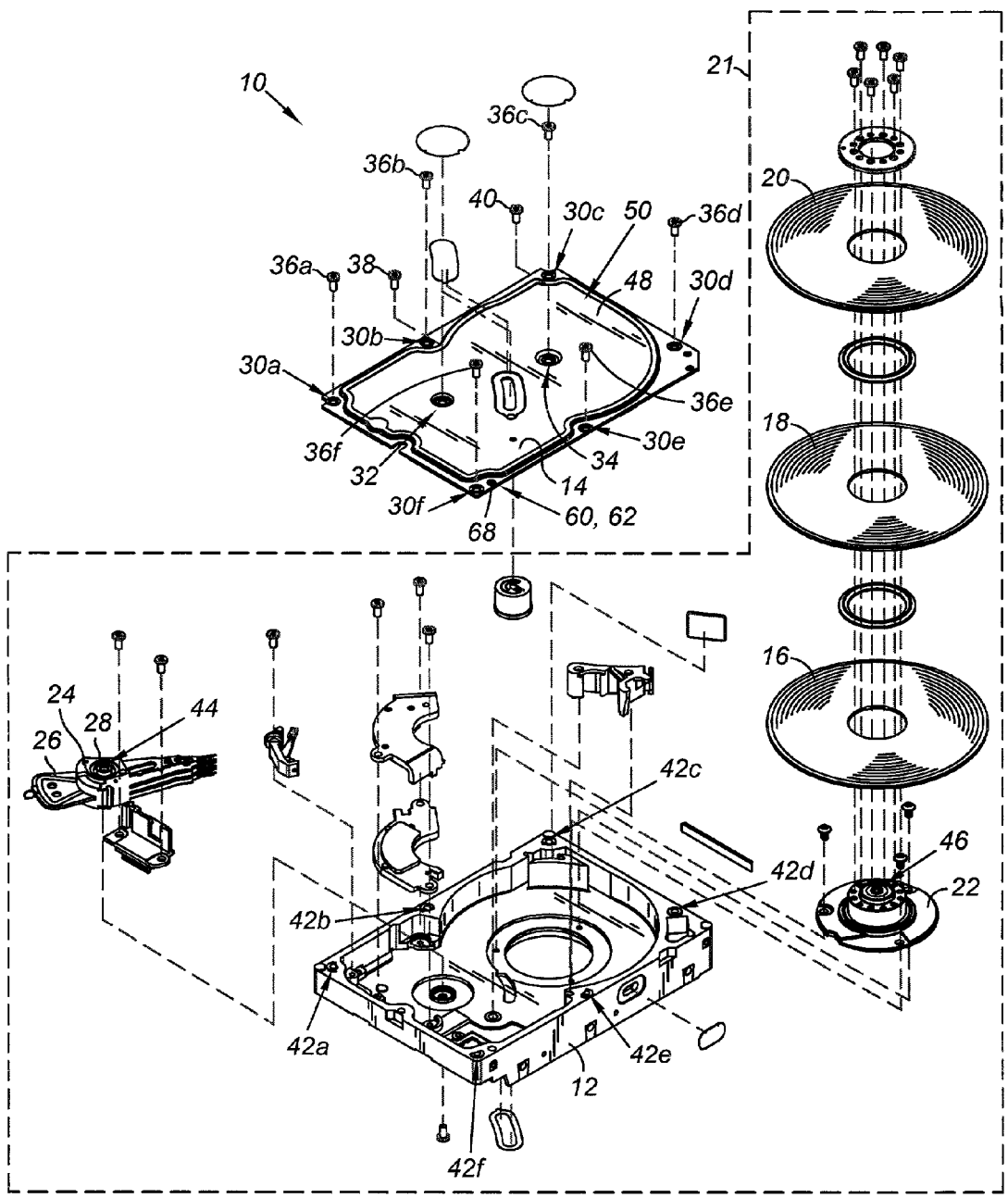
FIG. 1 is an exploded perspective view of a disk drive including a base assembly and a disk drive cover.

Referring now to the drawings wherein the showings are for purposes of illustrating preferred embodiments of the present invention only, and not for purposes of limiting the same, FIGS. 1–15 illustrate a disk drive assembly process in accordance with the aspects of the present invention.

Referring now to FIG. 1, there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive base 12 and a disk drive cover 14 that collectively house magnetic disks 16, 18, 20. The head disk assembly includes a base assembly 21 and the disk drive cover 14. The disks 16, 18, 20 each contain a plurality of tracks for storing data. The head disk assembly further includes a spindle motor 22 for rotating the disks 16, 18, 20. The head disk assembly further includes a head stack assembly 24. The head stack assembly 24 includes a rotatable actuator 26. A pivot bearing cartridge 28 is provided for pivoting the actuator 26 of the head stack assembly 24 relative to the rotating disks 16, 18, 20. The actuator 26 includes a plurality of actuator arms, each actuator arm supporting at least one head gimbal assembly ("HGA"). Each HGA includes a load beam, a gimbal, and a head or transducer which is configured to read/write data from the tracks. Suitably, the head is a magneto-resistive head ("MR head").

Figure 2:
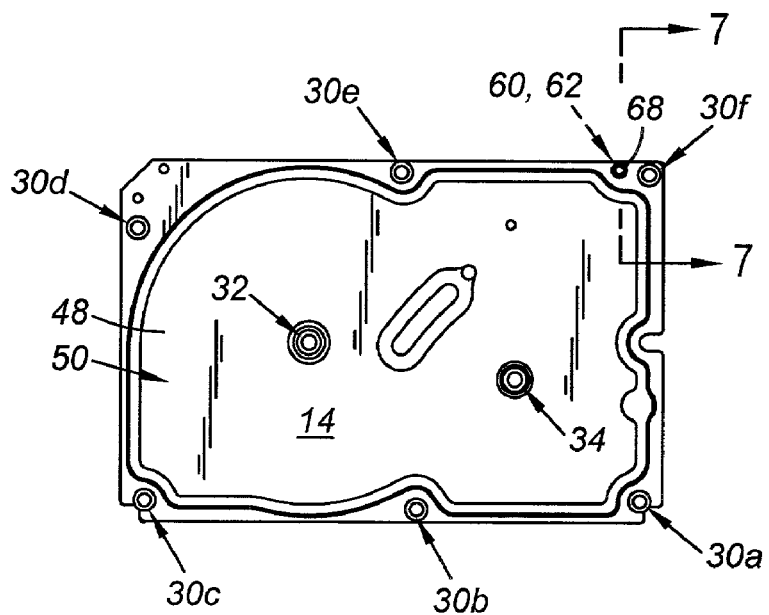
FIG. 2 is a top plan view of the disk drive cover of FIG. 1.

The disk drive cover 14 includes a plurality of fastener openings 30a–f, 32, 34. An enlarged plan view of the disk drive cover 14 is shown in FIG. 2. Corresponding to each of the fastener openings 30a–f, 32, 34 are a plurality of fasteners 36a–f, 38, 40. Suitably, the fasteners 36a–f, 38, 40 are conductive screws, such as stainless steel screws. The fasteners 36a–f, 38, 40 may be used to attach the disk drive cover 14 to the base assembly 21. In this regard, the disk drive base 12 may include fastener engagement holes 42a–f, the actuator 26 may have a fastener engagement hole 44, and the spindle motor 22 may have a fastener engagement hole 46 for respectively receiving the fasteners 36a–f, 38, 40.

Figure 3:
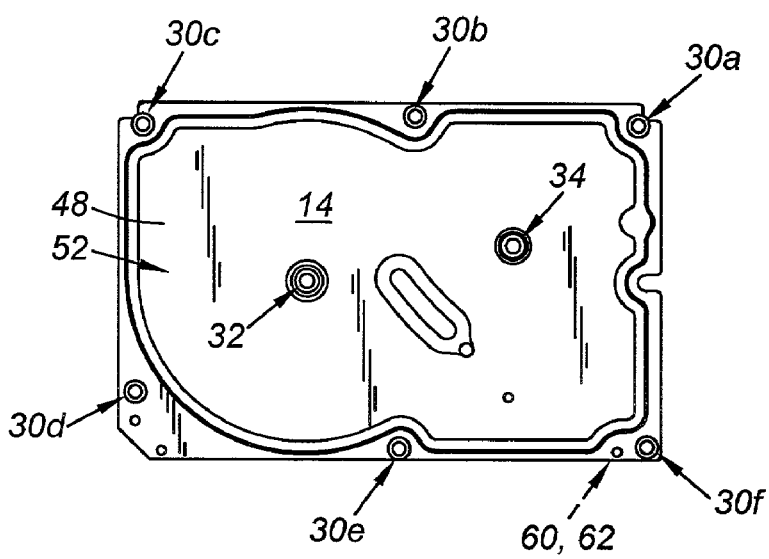
FIG. 3 is a bottom view of the disk drive cover.
Figure 7:
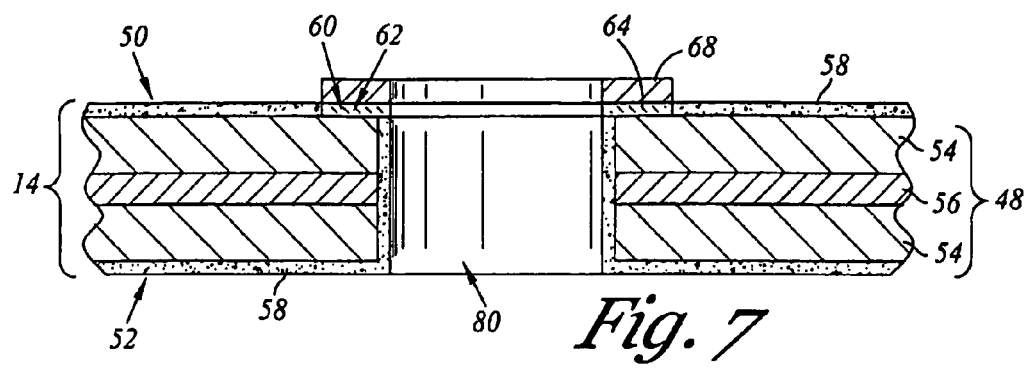
FIG. 7 is a cross-sectional view of a portion of the disk drive cover at a grounding opening and exposed surface as seen along axis 7—7 of FIG. 2.

Referring additionally now to FIGS. 2 and 3, there is depicted top and bottom plan views of the disk drive cover 14. Further, FIG. 7 is an enlarged cross-sectional view of a portion of the disk drive cover 14 as seen along axis 7—7 of FIG. 2. The disk drive cover 14 includes a main cover portion 48 having opposing sides 50, 52 and formed of an electrically conductive material. For example, the main cover portion 48 may be formed of cold rolled steel (also known as carbon steel) or aluminum. A conductive plastic material may also be suitable. The side 50 is associated with an outside face of the disk drive cover 14, and the side 52 is associated with an inside face of the disk drive cover 14.

It is contemplated that the cold rolled steel is a relatively inexpensive material in comparison to other material selections such a stainless steel or aluminum, although such other material selections may be utilized. It is further contemplated that the disk drive cover 14 may be machined stamped. The disk drive cover 14 may be formed of multiple layers 54 and further may include an insulative layer 56 between adjacent ones of the multiple layers 54. Where the disk drive cover 14 is formed of the layers 54, each of the layers 54 may be individually stamped and subsequently bonded to form a laminate structure.

Use of the cold rolled steel is contemplated to be relatively susceptible to corrosion. In this regard, an electrically insulative coating 58 may be disposed upon the main cover portion 48. The electrically insulative coating 58 may have corrosion resistant qualities to protect the surface of the main cover portion 48 from oxidation. In a preferred embodiment, the electrically insulative coating 58 is an epoxy coating ("E-coating"). Fabrication of the disk drive cover 14 with the electrically insulative coating 58 may be effected by various means. This may be effected via electrodeposition, a dipping process or a spray process for example.

The disk drive cover 14 includes a grounding opening 60 formed through the electrically insulative coating 58. The main cover portion 48 includes an exposed surface 62 at the grounding opening 60. In this regard, the grounding opening 60 is that region where the electrically insulative coating 58 is not located upon the main cover portion 48 thereby exposing the exposed surface 62.

Figure 4:
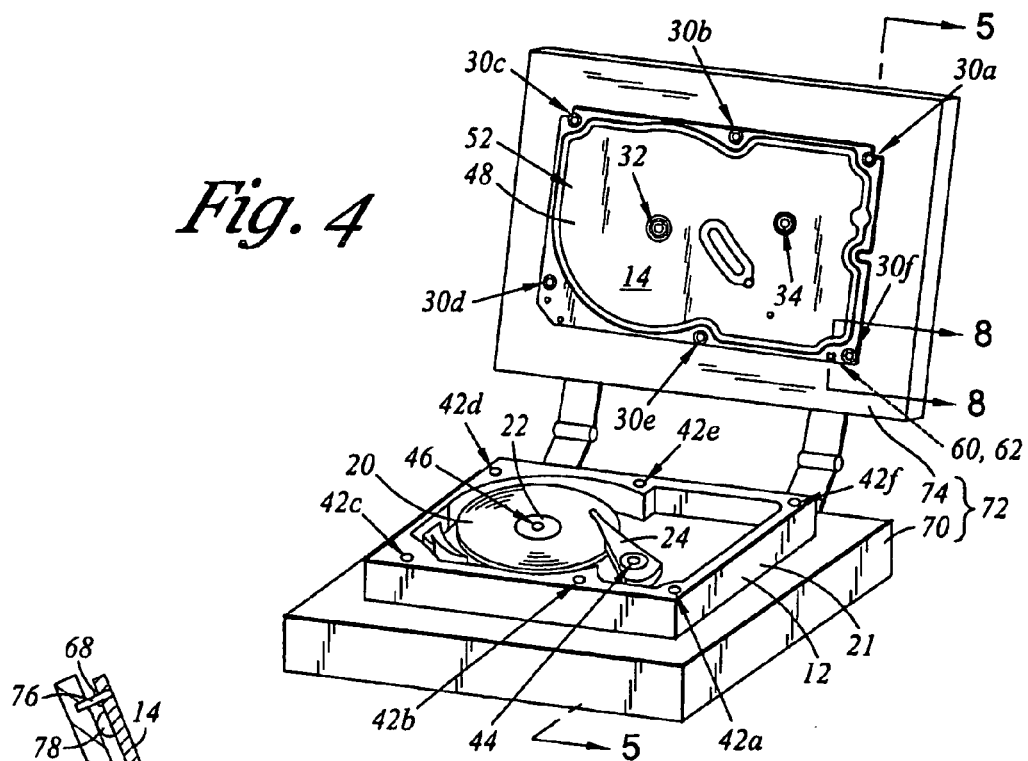
FIG. 4 is a perspective view of a fixture including a grounding element as shown with the disk drive cover and the base assembly as may be utilized according to the method of assembly of the invention.
Figure 5:
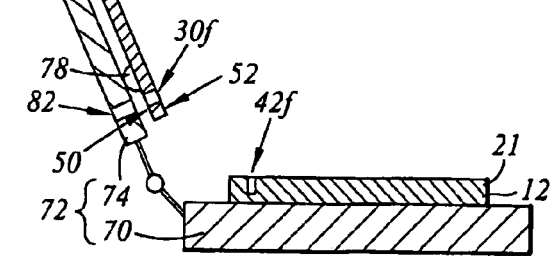
FIG. 5 is a cross-sectional side view of the fixture of FIG. 4 as seen along axis 5—5 of FIG. 4.
Figure 6:
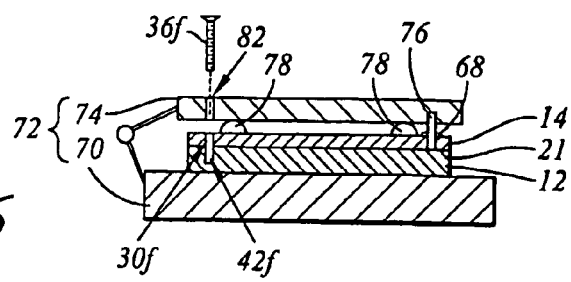
FIG. 6 is a cross-sectional side view of the fixture of FIG. 5, however as shown with the disk drive cover attached to the base assembly.

An aspect of the invention can be regarded as a method of assembling the disk drive 10. Referring additionally now to FIGS. 4–6, the method includes mounting the base assembly 21 upon a base support portion 70 of a fixture 72. The method further provides for mounting the disk drive cover 14 upon a cover support portion 74 of the fixture 72. Referring additionally now to FIG. 6, the method further includes positioning the disk drive cover 14 with a grounding element 76 of the fixture 72 in electrical contact with the exposed surface 62 for electrically grounding the disk drive cover 14. The method further includes attaching the disk drive cover 14 to the base assembly 21.

In further detail, there is depicted in FIG. 5 the cross-sectional side view of the fixture 72 as seen along axis 5—5 of FIG. 4. The disk drive cover 14 may be mounted upon the cover support portion 74 via suction elements 78. It is contemplated that the cover support portion 74 is grounded. The disk drive cover 14 is selectively positioned with respect to the grounding element 76 so as to establish an electrical path from the disk drive cover 14 through the grounding element 76 to the grounded cover support portion 74. As the disk drive cover 14 has been grounded the assembly of the disk drive 10 proceeds with the positioning of the disk drive cover 14 with respect to the base assembly 21 as shown in FIG. 6. It is contemplated that the cover support portion 74 is configured to facilitate such positioning. It is understood that the base support portion 70, the cover support portion 74, and the grounding element 76 may be integrally formed or attached to each other or exist as separate and distinct elements so as to collectively define the fixture 72.

Figure 8:
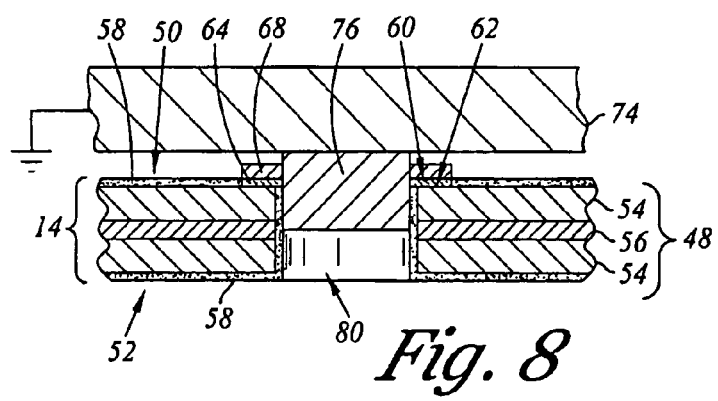
FIG. 8 is a cross-sectional view of a portion of a cover support portion of the fixture with a grounding element in relation to a portion of the disk drive cover of FIG. 7 as seen along axis 8— 8 of FIG. 4.

In the embodiment shown in FIGS. 7 and 8, the exposed surface 62 is disposed upon the side 50 of the main support portion 48. A conductive adhesive 64 is depicted as encapsulating the exposed surface 62 at the grounding opening 60. The conductive adhesive 64 is shown as utilized in attaching an intermediate contact element, such as the washer 68. As shown in FIG. 8, an electrical path to ground may be established through the exposed surface 62 to the conductive adhesive 64 to the washer 68 to the grounding element 76. The main support portion 48 may include a grounding opening 80 formed through the main support portion 48. The grounding opening 78 may be configured to internally receive the grounding element 76 as shown.

As shown in FIG. 6, upon positioning and placement of the disk drive cover 14 adjacent the base assembly 21, a fastener such as fastener 36f may be utilized to engage the disk drive cover 14 to the base assembly 21 and in particular the disk drive base 12. The cover support portion 74 may include an opening 82 formed to allow the fastener 36f to be passed through it for allowing installation of the fastener 36f with the cover 14 supported by the cover support portion 74. As such, the electrical path to ground may be maintained between the cover 14 and the cover support portion 74. It is contemplated that the method may include the final step of electrically grounding the cover 14 with the base assembly 21, and that this may be accomplished through the installation of the fastener 36f.

Figure 9:
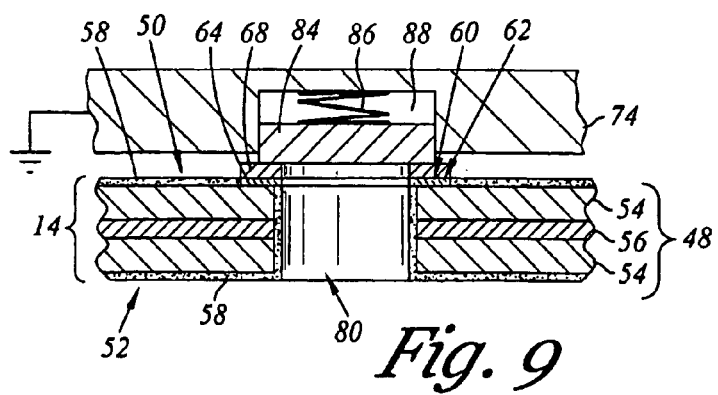
FIG. 9 is a cross-sectional view of a portion of the disk drive cover similar to FIG. 7, however with a grounding element in a spring loaded configuration.

The grounding element 76 may be formed as a rigid pin as shown in FIGS. 5, 6, and 8. Referring now to FIG. 9, there is depicted another embodiment of the grounding element as shown as a spring loaded pin 84. A compression spring 86 is housed in a recess 88 of the cover support portion 74. It is contemplated that other spring loaded arrangements may be utilized such as a leaf spring configuration.

Figure 10:
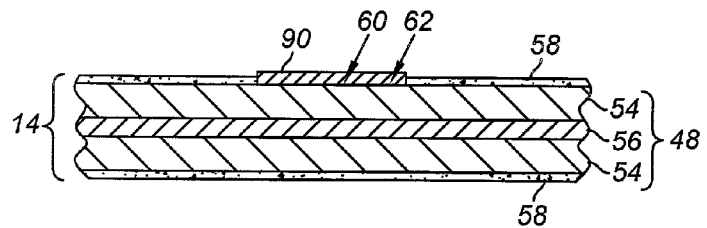
FIG. 10 is a cross-sectional view of a portion of the disk drive cover similar to FIG. 7, however with conductive coating at the exposed surface.

Referring now to FIG. 10, there is depicted another embodiment of the cover 14. As shown, a grounding element 90 is disposed within the grounding opening 60 upon exposed surface 62. The grounding element 90 may take the form of a metal coating such as an electroless Nickel coating.

Figure 11:
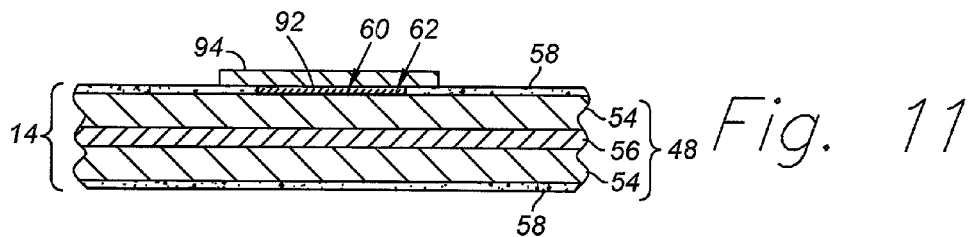
FIG. 11 is a cross-sectional view of a portion of the disk drive cover similar to FIG. 7, however with a conductive adhesive and disk at the exposed surface.

Referring now to FIG. 11, there is depicted another embodiment of the cover 14. As shown, a conductive adhesive 92 is disposed upon the exposed surface 62 at the grounding opening 60. The conductive adhesive 92 is used to secure a grounding element in the form of conductive disk or plate 94 which may be formed of metal for example.

Figure 12:
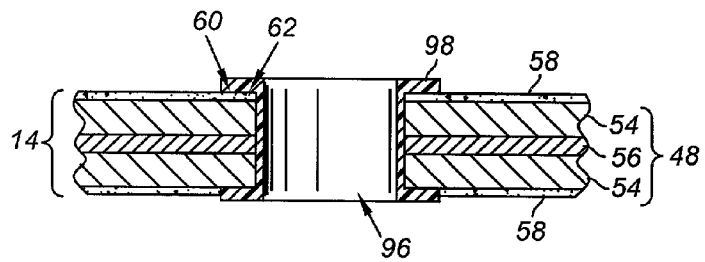
FIG. 12 is a cross-sectional view of a portion of the disk drive cover similar to FIG. 7, however with an H-shaped grommet at the exposed surface.

Referring now to FIG. 12, there is depicted another embodiment of the cover 14. As shown, an opening 96 is formed through the main cover portion 48. In this regard, the grounding opening 60 also extends through the main cover portion 48. The exposed surface 62 is configured as an inner surface within the main cover portion 48. An H-shaped conductive grommet 98 is disposed within the opening 96 in contact with the exposed surface 62. The grommet 98 may be attached via a swage process for example.

Figure 13:
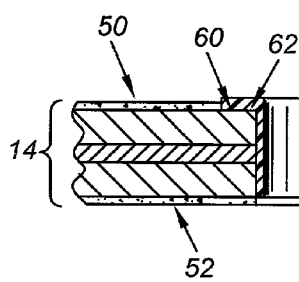
FIG. 13 is a cross-sectional view of a portion of the disk drive cover similar to FIG. 7, however with a T-shaped grommet at the exposed surface.

Referring now to FIG. 13, there is depicted another embodiment of the cover 14. As shown, an opening 100 is formed through the main cover portion 48. In this regard, the grounding opening 60 also extends through the main cover portion 48. The exposed surface 62 is upon the side of the main cover portion 48. A T-shaped conductive grommet 102 is disposed within the opening 100 in contact with the exposed surface 62. The grommet 102 may be attached via a swage process for example.

Figure 14:
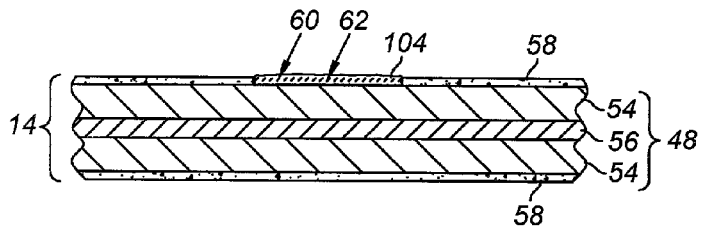
FIG. 14 is a cross-sectional view of a portion of the disk drive cover similar to FIG. 7, however with conductive adhesive at the exposed surface.

Referring now to FIG. 14, there is depicted another embodiment of the cover 14. As shown, a grounding element 104 is disposed within the grounding opening 60 upon exposed surface 62. The grounding element 104 may take the form of conductive adhesive.

Figure 15:
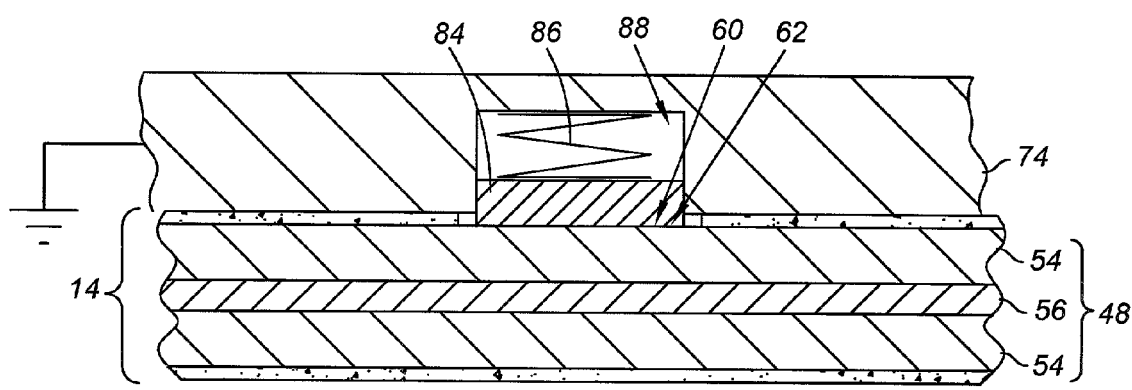
FIG. 15 is a cross-sectional view of a portion of a disk drive cover support in relation to a portion of the disk drive cover, however with direct contact between the grounding element and the exposed surface.

Referring now to FIG. 15, there is depicted another embodiment of the cover 14 as shown with the grounding element 84 as shown in FIG. 9. The grounding element 84 is disposed in electrical contact with the exposed surface 62 by direct physical contact between the grounding element 84 and the exposed surface 62.

We claim:

1. A method of assembling a disk drive, the method comprising:
    a) providing a disk drive base;
    b) providing a disk drive cover mounted upon a cover support portion of an assembly fixture that is not a part of the disk drive being assembled, the disk drive cover having an inside face and an outside face, the inside face being coated with an electrically insulative material;
    c) contacting, continuously during a period, the outside face with an electrically conductive grounding element that is attached to the cover support portion, the grounding element is part of the assembly fixture that is not part of the disk drive being assembled; and
    d) attaching the disk drive cover to the disk drive base during the period.

2. The method of claim 1 wherein the outside face comprises an electrically conductive metal.

3. The method of claim 2 wherein the outside face comprises carbon steel.

4. The method of claim 1 wherein the grounding element comprises a pin.

5. The method of claim 4 wherein the pin is spring loaded.

6. The method of claim 1 wherein the attaching further comprises inserting an electrically conductive fastener partially into the disk drive base with a portion of the fastener contacting the outside face.

7. The method of claim 1 wherein the disk drive cover has a grounding opening formed through the electrically insulative material, and wherein the contacting further comprises positioning the electrically conductive grounding element through the grounding opening in contact with the outside face.

* * * * *